Figure 1:
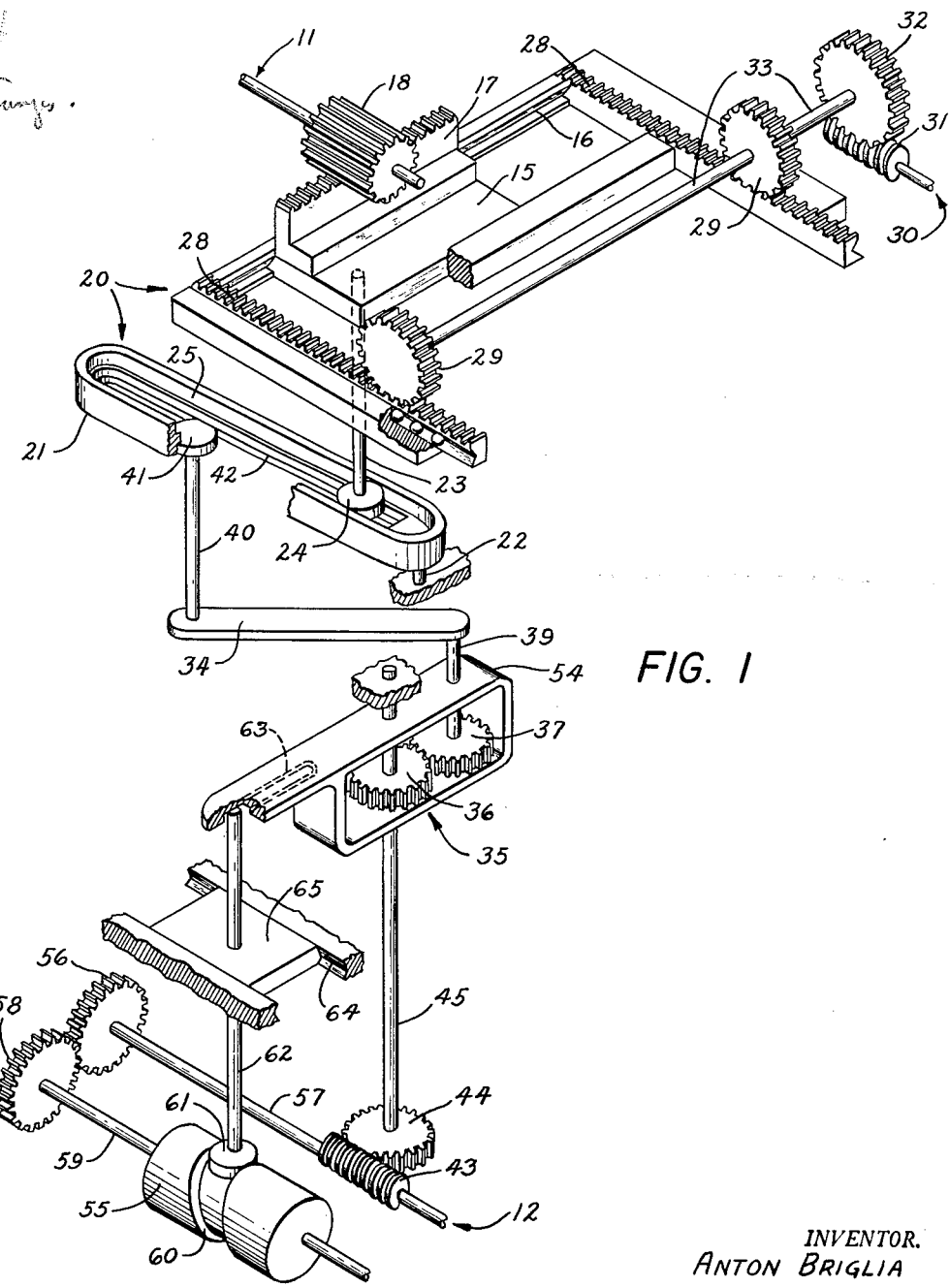

May 29, 1956   A. BRIGLIA   2,747,798
EROSION-CORRECTION MECHANISM
Original Filed June 21, 1946   2 Sheets-Sheet 1

INVENTOR.
ANTON BRIGLIA
BY
ATTORNEYS

# United States Patent Office 2,747,798
Patented May 29, 1956

2,747,798

EROSION-CORRECTION MECHANISM

Anton Briglia, New York, N. Y.

Continuation of application Serial No. 678,180, June 21, 1946. This application November 9, 1950, Serial No. 194,881

7 Claims. (Cl. 235—61.5)

(Granted under Title 35, U. S. Code (1952), sec. 266)

The invention described herein may be manufactured and used by or for the Government of the United States of America for governmental purposes without the payment of any royalties thereon or therefor.

This is a continuation of my copending application Serial No. 678,180, filed June 21, 1946, which has become abandoned since the present application was filed.

This invention pertains to the art of sighting guns, and it comprises mechanism to correct for gun erosion. The invention is particularly useful for larger caliber guns as distinguished from small arms. The structure disclosed is adapted to be embodied in a gun-elevation indicator or receiver regulator.

The firing of a gun produces erosion, and this condition is evidenced by velocity loss. It is customary under prior-art practice to correct for erosion by raising the gun elevation to increase the sight angle by an amount that is calculated to compensate for velocity loss that is caused by gun erosion.

Known prior-art erosion-correction mechanisms are not accurate for all ranges. They are nearly accurate within those ranges at which a gun is expected to be fired most commonly, but when a gun is to be fired at or near its extreme or maximum range, it becomes necessary in order to fire the gun with accuracy to correct additionally to accomplish complete compensation for erosion. Erosion-correction mechanisms of the prior-art are generally accurate to a satisfactory degree of accuracy for ranges up to 35° sight angle.

Conventional prior-art erosion-correction mechanisms include a tangent multiplier in the drive of the output by the sight-angle input, the tangent multiplier producing a tangent-value output, which is nearly the same as the correction value required to compensate accurately for actual gun erosion for all ranges up to 30° sight angle. For ranges higher than 30° sight angle, tangent-value corrections deviate from accuracy in progressively increasing increments as the range is increased towards the maximum range. Thus, for a range above a 35° sight angle, the deviation from accuracy of tangent-value output is outside the scope of a satisfactory degree of accuracy.

Under practice prior to modern development of aircraft, when a target was generally another surface craft, or a land target not far removed from sea level, prior art erosion-correction mechanisms were not excessively inaccurate. Relatively small additional range was derived from sight angles above 35° up to the limiting range for surface targets of 45° sight angle, and this slight additional range was not frequently required. Therefore, it was not often in practice that a sight angle over 35° was needed. Under present day practice, aircraft targets are common, and guns are constructed for sight angles that are higher than 45°.

Applicant's invention comprises a mechanical movement which is accurate to correct for erosion for all ranges of the gun, accuracy being accomplished by introducing an additional variable into the tangent multiplier of the prior-art erosion correction mechanism.

An epicyclic gearing is provided comprising a gear train in the drive to the tangent multiplier from the sight-angle input. The arm of the epicyclic gearing is actuated by a compensating cam, which is driven by the sight-angle input in time with the drive of the gear train. Actuation of the epicyclic arm provides additional input to the tangent multiplier, which modifies the input to the tangent multiplier that is provided by the sight-angle input driving through the gear train. The cam is constructed with a contour that provides a corrected modification of the tangent-value output in conformance with actual erosion correction requirements for any and all ranges at which the gun is capable of being fired.

Figure 2:
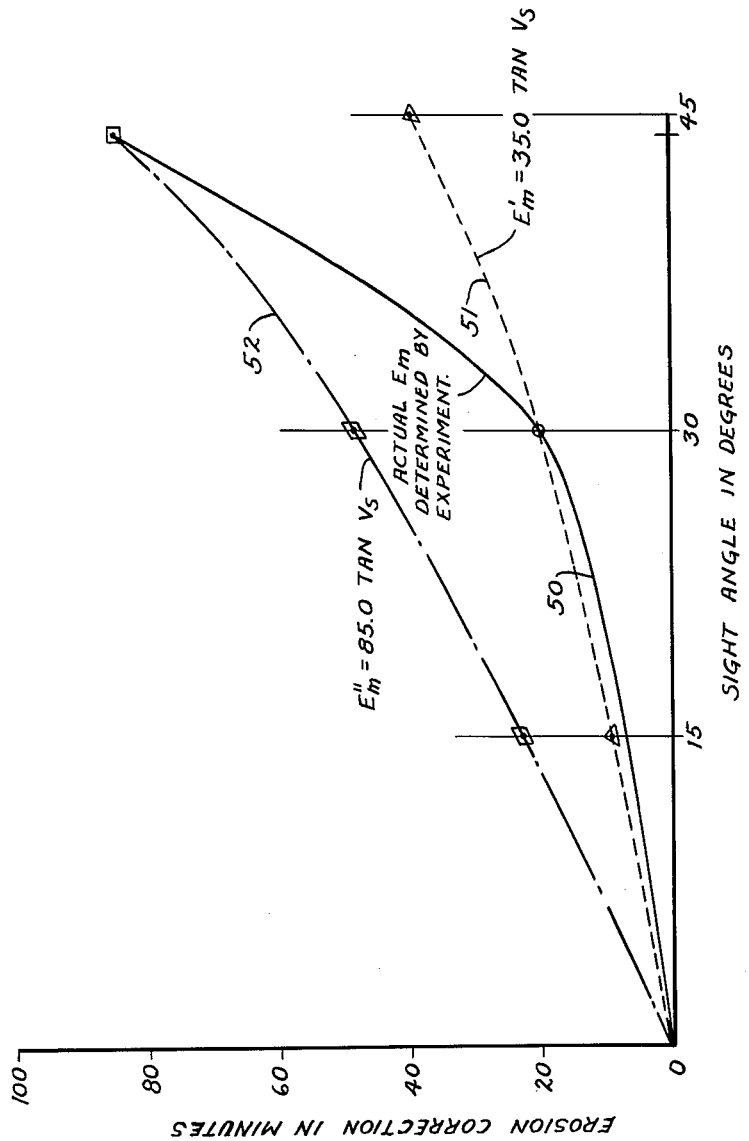

For a fuller appreciation of the principles of applicant's invention, and for a more complete understanding of the disclosed embodiment thereof, attention is now directed to the accompanying drawings, in which Fig. 1 is a perspective illustrating one form of mechanism schematically that embodies applicant's invention, and Fig. 2 presents a graph illustrating curves for determining erosion correction mathematically.

The disclosed structure comprises an erosion-correction output at 11, which is driven by the sight-angle input at 12.

Carriage 15 is mounted to traverse along the guideways 16, and by the traverse the rack 17 of carriage 15 rotates the rack-pinion 18 to produce the output of 11. Traverse of carriage 15 along guideways 16 is under drive by the tangent multiplier illustrated generally at 20, and the tangent multiplier is in the drive of the output 11 from the sight-angle input 12. The nature of the drive from the sight-angle input 12 to the output 11, through tangent multiplier 20, will appear more fully hereinafter.

The tangent multiplier 20 comprises a variable-lever-arm linkage embodied in the lever 21, which is mounted to swing on the fulcrum of its fixed pivot 22. The driven lever 21 is connected with carriage 15 to drive it by means of the connecting pin 23, comprising an abutment head 24 which is adapted to ride along the guideway 25 of lever 21 to thereby vary the length of lever arm from 24 to 22 of lever 21.

Guideways 16 and the carriage 15 are mounted on the parallel racks 28 to travel therewith, and the parallel racks 28 are disposed at right angles to the guideways 16, thus providing two motions of carriage 15 at right angles to each other. Racks 28 are movable under drive of the rack-pinions 29 at right angles to the traverse of carriage 15 along the guideways 16. The pinion 18 is elongated for the purpose, to remain in mesh with rack 17 when carriage 15 is traversed by the racks 28 lengthwise of output 11. The velocity-loss input 30 drives the pinions 29 through the worm 31 and worm gear 32, the latter being secured to the shaft 33 to which the rack-pinions 29 are also secured. The velocity-loss input 30 is operated to actuate the abutment head 24 lengthwise of lever 21, and the length of the lever arm from 24 to 22 is adjusted by this means to determine the extent of traverse of carriage 15 along the ways 16.

Correction for velocity-loss is introduced by input 30 in accordance with the estimated quantum of gun erosion at any time during the life of the gun. For example, when a gun is new it has not become eroded, and the velocity-loss input is accordingly set for zero correction. At the zero setting of the velocity loss input 30, the abutment head 24 and its pin 23 are positioned coaxially with the fixed pivot 22, and the length of the lever arm from 24 to 22 is zero. Accordingly when the velocity-loss input 30 is set at zero, actuation of lever 21 produces no movement of carriage 15 along the ways 16, and there is no erosion-correction output at 11.

After a gun has been fired, and erosion has accordingly set in, the velocity-loss input 30 is adjusted to shift the abutment head 24 along guideway 25 lengthwise of lever 21 away from coaxial relationship with the fixed pivot 22. The length of the lever arm from 24 to 22 is thereby given a quantitative value. Adjustment of the length of the lever arm from 24 to 22 to greater values by means of the velocity-loss input 30 is made in accordance with the quantum of gun erosion that is estimated from the number of times the gun has been fired.

It will be noted from the hereinbefore description that the drive by the tangent multiplier 20 provides a tangent-value output.

The amount of correction necessary to compensate for gun erosion varies according to the range at which the gun is fired, and this is determined by the quantity introduced by the sight-angle input 12.

Epicyclic gearing 35 is provided in the drive from the sight-angle input 12 to the output 11, and particularly between the input and the tangent multiplier 20, and comprises a planetary gear train of which the driving gear 36 is the sun gear and 37 is the driven planet gear. The actuating lever 34 is secured to shaft 39 to which the planet gear 37 is also secured or keyed, and lever 34 comprises the connecting pin 40 with an abutment head 41 which rides lengthwise of lever 21 in the guideway 42 thereof. The lever arm from 24 to 22 is the driven member of the variable-lever-arm linkage embodied in lever 21 of the tangent multiplier 20, and the lever arm from 41 to 22 is the driving member of the variable-lever-arm linkage. The lever that constitutes the lever arm from 41 to 22 is actuated by the epicyclic gearing 35, and specifically from the planetary gear train 36, 37 thereof when the planet gear 37 is rotated to swing the actuating lever 34.

The sight-angle input 12 drives the planetary gear train 36, 37, the drive being through the worm 43 and the worm gear 44 which is secured to shaft 45 to which the driving or sun gear 36 is also secured. Thus, in its drive of the erosion-correction output 11, the sight-angle input 12 provides an input to the tangent multiplier 20 by driving it through rotation of the planet gear 37.

Erosion-correction mechanism of the prior art solves the equation $E^1{}_m = m$ tan. $Vs$, in which "$Vs$" is the sight angle, i. e., the angle to which the barrel of the gun is elevated to attain the desired range. "$E^1{}_m$" is the mathematically determined erosion correction which depends upon the value of the constant "$m$." For a gun that is directed at surface targets only, the constant "$m$" may be determined so as to be accurate to a satisfactory degree of accuracy for most ranges at which the gun is expected to be fired.

In one typical example, with the value of constant "$m$" being 35.0, the tangent curve follows the curve of actual correction closely up to a sight angle of 35°. See Fig. 2. The tangent curve 51, $E^1{}_m = 35.0$ tan. $Vs$, is nearly coincidental with although slightly below the curve 50 of actual erosion correction for sight-angles up to 30°, and the curve 50 deviates sharply away from the tangent curve 51 at sight angles above 30°. The curve 50 in Fig. 2 is a graph of actual erosion correction, $E_m$, determined experimentally for various ranges of a gun.

It will be noted particularly that the mathematically derived curve 51 follows the curve 50 of actual erosion correction with only slight departure up to a sight angle of 35°, the curve 50 being slightly below curve 51 most of the way. At 30° sight angle the curve 50 crosses the mathematically derived curve 51, and beyond the 30° sight angle curve 50 deviates sharply upwardly. For ranges greater than 30° sight angle, deviation of the experimentally derived curve 51 from mathematically derived curve 50 increases progressively in progressively increasing increments. In spite of the differences between curves 50 and 51 as illustrated in Fig. 2, the tangent curve is accurate to a satisfactory degree of accuracy for surface targets within the ranges at which a gun is usually fired, it being seldom that a gun elevation of more than 35° sight angle is required for surface targets.

It will also be noted in Fig. 2 that, for each of elevations higher than 35° sight angle, a tangent curve may be made to coincide with or intersect curve 50 of actual erosion correction by increasing the value of the constant "$m$" correspondingly. In the illustrated example of Fig. 2, the mathematically determined tangent curve 52 crosses the curve 50 of experimentally determined erosion correction at a sight angle of about 43°, which is at or near the maximum range in actual practice of guns directed at surface targets. Curve 52 is mathematically derived from the equation, $E''{}_m = 85.0$ tan. $Vs$, in which the value of "$m$" is 85.0.

In the erosion-correction mechanism of the present invention, accurate compensation for erosion correction is determined automatically for all ranges of the gun, and this is done by introducing an additional variable into the drive of the erosion-correction output 11 from the sight angle input 12 through the tangent multiplier 20. Accurate correction for all ranges is accomplished by introducing from the sight-angle input 12 an additional input into the tangent multiplier 20 which modifies the input which is introduced by the sight-angle input driving the gear train 36, 37 through worm 43 and shaft 45.

The epicyclic arm 54 is a second movement of the epicyclic gearing 35, in addition to the gear train 36, 37, and it swings on the axis of shaft 45 of the sun gear 36 to rotate the planet gear 37 on its axis by its rotation around the sun gear. The rotation of gear 37 produced by movement of the epicyclic arm 54 operates actuating lever 34 to swing the lever 21, and thereby introduces an input into tangent multiplier 20 which is a correction of the value introduced by rotation of gear 37 under drive from the sight-angle input 12 through worm 43, shaft 45 and sun gear 36. The described differential rotation of gear 37, being the resultant of its drive through worm 43, sun gear 36, and its drive by swing of the epicyclic arm 54, thus provides a corrected input into tangent multiplier 20.

There is an additional motion caused by swing of the epicyclic arm 54. The shaft 39 of actuating lever 34 is moved relative to the fixed pivot 22 of lever 21 whenever the epicyclic arm 54 swings on the axis of sun gear 36, and thereby moves the actuating lever 34 relative to the lever from 41 to 22 which it drives to traverse the abutment head 41 of pin 40 along the guideway 42. The length of the lever arm from 41 to 22 is changed thereby. The lever from 41 to 22 being the driving lever in the motion of which the lever from 24 to 22 is driven, the moment-arm ratio between the two levers is modified by shaft 39 being moved relative to fixed shaft 22, and this may appreciably effect the total input to tangent multiplier 20 that is produced by swing of the epicyclic arm 54. Variation of the lever-arm length of lever 41-to-22 is governable, however, and may be controlled by the relative dimensions and locations of the two levers 21 and 34, and thereby may be held within quantity limits which are negligible relative to the quantity of correction produced by differential rotation of planet gear 37.

The epicyclic arm 54 is actuated by the cam 55, which is driven from the sight-angle input 12 in time with the drive of the planetary gear train 36, 37, the drive of cam 55 being through gear 56 secured to the same shaft 57 with the worm 43, and the gear 58 secured to the same shaft 59 with the cam 55. Cam-way 60 for the follower 61 determines movement of epicyclic arm 54. Pin 62 of cam-follower 61 engages the bearing slot 63 of epicyclic arm 54. Guideways 64 are provided for the block 65 to which the pin 62 is secured, and the guideways 64 govern movement of pin 62 in a plane of the axis of cam shaft 59.

The variable introduced by cam 55 is an amount that varies with the sight angle in accordance with the requisite compensation for increase of erosion correction with range. This may be expressed mathematically by means of the empirical formula, $E_m = m \tan(K \cdot V_s \pm \phi)$, in which "$m$" is a constant for the corrected sight angle, "$V_s$" is the sight angle and "$K$" a constant therefore, and "$\phi$" is the empirically determined angular value or factor for erosion correction from which, when it is algebraically added to the value of "$K \cdot V_s$," an angular value is derived which corresponds with the requisite corrected-value of the sight angle for correction of actual erosion. "$E_m$" then constitutes a mathematically-determined erosion correction, and it corresponds with the experimentally-determined erosion correction which is indicated graphically by curve 50 in Fig. 2. The value of the factor "$\phi$," it will be noted is variable in accordance with the value of the sight angle "$V_s$."

In any event, the quantity introduced by the cam 55 is such as to compensate accurately for gun erosion at any range at which the gun may be fired, and the cam-way 60 is constructed with a contour that produces the desired result. The contour of cam-way 60 may be determined mathematically, or it may be determined empirically, for example, by a cut and try method.

The characteristic that the cam 55 is driven by the sight-angle input 12 in time with the gear train 36, 37 makes each cylindrical element of the cam correspond with an increment of sight-angle input as manifested by the magnitude of angular displacement of planet gear 37. Accordingly, there is a predetermined ratio for each sight angle between the circular displacement of gear 37 resulting from swing of the epicyclic arm and circular displacement of gear 37 driven from worm 43 through shaft 45 and the sun gear 36. The several correct ratios of different angular displacements of gear 37 by the two movements may be determined mathematically, and the requisite contour of cam-way 60 may be established thereby accordingly. If the input to tangent multiplier 20 is effected critically by variation of length of the lever arm from 41 to 22 as hereinbefore described, the mathematically determined contour of cam-way 60 may be modified to whatever extent is dictated by the circumstances. The appropriate contour of cam-way 60 is thus determined accurately. Whether the contour of cam-way 60 is determined mathematically or experimentally, the curve of $E_m$ that results from introducing the variable of cam 55 by means of the mechanism of Fig. 1 is made to coincide precisely with the experimentally determined curve 50 of Fig. 2 throughout its length. Erosion corrections are therefore accurate for sight angles below 35° as well as for sight angles above 35°, and in anti-aircraft guns for sight angles from 35° upwardly beyond 45° to the extreme range of the gun.

The value introduced by the sight-angle input 12 is corrected before the value of velocity-loss input 30 is introduced. Correction by cam 55 through epicycle arm 54, it will be noted, is introduced to the driving lever constituting the lever arm from 41 to 22 of the variable-lever-arm linkage of lever 21, and thus before the correction of the velocity-loss input 30 is introduced into the driven lever constituting the lever arm from 24 to 22 of lever 21. Accordingly, the mechanism of the present invention introduces a correction of the sight angle introduced by input 12, the correction operating to compensate for velocity-loss values in accordance with range. The corrected angular value thus introduced by the sight-angle input 12 as an input to tangent multiplier 20 is additionally corrected for velocity loss by the input 30 in accordance with quantum of erosion as estimated by the incident life of the gun.

The angular correction of the sight angle that is introduced by the sight-angle input 12 through cam 55 operates to adjust the tangent multiplier 20 to modify the tangent value of its output. A contour of the cam-way 60 of cam 55 is constructed for that value which corrects the tangent value of the output at 11 in conformance with actual erosion correction at the range of the input by sight-angle input 12.

The mechanism of the disclosure is one practical embodiment of the invention, which is susceptible of a number of modifications without departing from the scope of the invention. The invention is not limited to the specific embodiment disclosed, but is determined by the accompanying claims.

1. In gun-erosion-correction mechanism, a sight-angle input adjustable according to range, an erosion-correction output and a drive from the sight-angle input to the output including a variable-lever-arm linkage which comprises a driven lever to drive the output and a driving lever for the driven lever, a velocity-loss input adjustable according to quantum of erosion and a drive from the velocity-loss input to the variable-lever-arm linkage operable to vary the lever-arm length of the driven lever thereof, the drive from the sight-angle input to the output comprising epicyclic gearing embodying a gear train and an epicyclic arm, a drive from the sight-angle input to the gear train of the epicyclic gearing, a drive from the gear train to the driving lever of the variable-lever-arm linkage, a cam driven by the sight-angle input in time with the gear train of the epicyclic gearing, a follower for the cam actuating the epicyclic arm to produce a differential drive in the gear train, the cam being contoured for the differential drive of the gear train to introduce appropriate corrected input into the driving lever of the variable-lever-arm linkage.

2. In gun-erosion-correction mechanism that includes a variable-lever-arm linkage comprising a driving lever, a sight-angle input adjustable according to range, epicyclic gearing comprising an epicyclic arm and a gear train embodying a driving sun gear and a driven planet gear, a drive from the sight-angle input through the gear train, a drive from the planet gear to the driving lever of the variable-lever-arm linkage, a cam driven by the sight-angle input in time with the gear train of the epicyclic gearing, a follower for the cam operable to swing the epicyclic arm for differential drive of the planet gear to correct for erosion in accordance with sight-angle input.

3. In gun-erosion correction mechanism that embodies an output and a drive therefore comprising a tangent multiplier for tangent value output, a sight-angle input adjustable according to range, a drive from the sight-angle input to the output through the tangent multiplier, a cam driven by the sight-angle input in time with its drive of the output through the tangent multiplier, a drive from the cam to the tangent multiplier, the cam being contoured for driving the tangent multiplier to modify its tangent value output in conformance with gun erosion correction for the range of the sight-angle input.

4. In a mechanical movement, a linkage, an epicyclic gearing comprising a gear train and an epicyclic arm, an input-drive for the gear train, an operating-drive from the gear train to the linkage constituting an input thereto, a compensating cam driven in time witht the gear train, and a drive from the cam through the epicyclic arm to the linkage producing an input thereto which modifies the input from the input drive of the gear train, the linkage comprising a driving lever actuated by the operating-drive from the gear train, the driving lever comprising a variable length of lever arm, and the drive from the cam to the linkage operating to vary the length of lever arm of the driving lever.

5. In a mechanical movement, a linkage, epicyclic gearing comprising an epicyclic arm and a gear train embodying a driving sun gear and a driven planet gear, an input-drive for the gear train, an operating-drive from the planet gear to the linkage constituting an input thereto, a compensating cam driven in time with the gear train, and a drive from the cam through the epicyclic arm to the linkage producing an input into the linkage which modifies the input from the input-drive of the gear train, the linkage comprising a driving lever, the operating-drive to the linkage comprising an actuating lever for the driving lever, the actuating lever being secured to the planet gear to swing coaxially therewith, the cam being contoured for the desired correction of the input to the linkage.

6. In a mechanical movement as defined in claim 5, the drive from the cam through the epicyclic arm operating to swing the epicyclic arm on the axis of the sun gear, the corrected input to the linkage comprising differential drive of the planet gear produced by swing of the epicyclic arm.

7. In a mechanical movement as defined in claim 6, the driving lever comprising a length of lever arm that is variable by relative movement of the actuating lever, the cam being contoured to compensate for variation of a length of lever arm of the driving lever.

References Cited in the file of this patent

UNITED STATES PATENTS

| | | |
|---|---|---|
| 1,813,534 | Ford | July 7, 1931 |
| 1,938,825 | Ford | Dec. 12, 1933 |
| 2,397,783 | Ford | Apr. 2, 1946 |
| 2,428,372 | Knowles | Oct. 7, 1947 |
| 2,433,006 | Weiss | Dec. 23, 1947 |
| 2,442,792 | White | June 8, 1948 |

OTHER REFERENCES

"Mechanics of Machinery," by Robert C. Heck, published by McGraw-Hill, first edition, January 2, 1924, p. 230.

"Mechanical Engineers' Handbook," by Marks, third edition, pp. 861–862.